(12) United States Patent
Zaguroli, Jr.

(10) Patent No.: US 10,099,904 B1
(45) Date of Patent: Oct. 16, 2018

(54) SAFETY ARRANGEMENT FOR A HOIST

(71) Applicant: James Zaguroli, Jr., Auburn Hills, MI (US)

(72) Inventor: James Zaguroli, Jr., Auburn Hills, MI (US)

( * ) Notice: Subject to any disclaimer, the term of this patent is extended or adjusted under 35 U.S.C. 154(b) by 0 days.

(21) Appl. No.: 15/727,710

(22) Filed: Oct. 9, 2017

Related U.S. Application Data

(60) Provisional application No. 62/510,837, filed on May 25, 2017, provisional application No. 62/537,043, filed on Jul. 26, 2017, provisional application No. 62/556,692, filed on Sep. 11, 2017.

(51) Int. Cl.

| | | |
|---|---|---|
| B66C 15/02 | (2006.01) |
| B66B 5/12 | (2006.01) |
| F16D 63/00 | (2006.01) |
| B66B 5/18 | (2006.01) |
| B66B 11/06 | (2006.01) |
| B66D 5/16 | (2006.01) |

(52) U.S. Cl.
CPC ............... B66C 15/02 (2013.01); B66B 5/12 (2013.01); B66B 5/185 (2013.01); F16D 63/008 (2013.01); B66B 11/06 (2013.01); B66D 5/16 (2013.01)

(58) Field of Classification Search
CPC .. B66D 1/26; B66D 3/18; B66C 15/02; B66B 5/12; B66B 5/185; B66B 5/16; B66B 11/06; F16D 63/008
See application file for complete search history.

(56) References Cited

U.S. PATENT DOCUMENTS

| | | | | |
|---|---|---|---|---|
| 810,884 A | * | 1/1906 | Pilling .................... | B66D 1/26 254/284 |
| 1,288,137 A | * | 12/1918 | Newhall .................. | B66D 3/04 254/264 |
| 1,468,916 A | * | 9/1923 | Newhall .................. | B66D 3/18 254/343 |
| 2,240,523 A | * | 5/1941 | Schramm ................ | B66D 3/26 254/362 |
| 2,590,623 A | * | 3/1952 | Hulse, Jr. ................ | B66D 1/26 254/284 |
| 2,649,279 A | * | 8/1953 | Jones .................... | D06F 57/125 254/329 |
| 2,649,280 A | * | 8/1953 | Rausenberger .......... | B66D 3/18 254/372 |
| 3,125,200 A | * | 3/1964 | Kaman .................... | B66D 1/08 254/344 |

(Continued)

FOREIGN PATENT DOCUMENTS

DE    3129882    * 7/1989

Primary Examiner — Michael E Gallion
(74) Attorney, Agent, or Firm — John R. Benefiel (57) ABSTRACT

A hoist security arrangement for avoiding dropping of the load when the chain or cable breaks includes a longer redundant auxiliary chain or cable disposed alongside the main chain or cable and which is raised and lowered synchronously with the slightly shorter main chain or cable so that the main chain or cable normally supports the entire weight of the load. If the main chain or cable breaks, the load drops slightly until the slack in the redundant auxiliary chain or cable is eliminated to hold the load solely by tensioning the auxiliary chain or cable. The extent of slack is set to insure that slight lengthening of the main chain as caused by wear does not result in loading of the auxiliary chain or cable.

9 Claims, 7 Drawing Sheets

(56) References Cited

U.S. PATENT DOCUMENTS

| | | | | |
|---|---|---|---|---|
| 4,105,167 A * | 8/1978 | Knox | B65H 54/70 | 242/390.2 |
| 4,575,050 A * | 3/1986 | Bechmann | B66D 1/7405 | 254/286 |
| 4,635,903 A * | 1/1987 | Broyden | B66D 3/26 | 174/DIG. 12 |
| 5,553,832 A * | 9/1996 | Zaguroli, Jr. | B66D 3/20 | 188/185 |
| 5,593,138 A * | 1/1997 | Zaguroli, Jr. | B66D 3/18 | 254/288 |
| 5,989,166 A * | 11/1999 | Capizzo | A63B 21/0783 | 482/1 |
| 6,179,270 B1 * | 1/2001 | Higdon | B66D 3/16 | 254/358 |
| 7,175,162 B1 * | 2/2007 | Ratcliff | B66D 3/18 | 212/174 |
| 7,533,869 B2 * | 5/2009 | Boda | B62H 3/12 | 254/352 |
| 8,336,860 B1 * | 12/2012 | Powell | B66D 3/16 | 254/243 |
| 9,700,810 B2 * | 7/2017 | Hoffend, Jr. | A63J 1/02 | |
| 2003/0213226 A1 * | 11/2003 | Moehnke | E02F 3/58 | 59/78 |
| 2004/0195553 A1 * | 10/2004 | Hayashi | B66C 13/08 | 254/294 |
| 2006/0151759 A1 * | 7/2006 | Key | H02G 1/08 | 254/134.3 R |
| 2006/0226106 A1 * | 10/2006 | Zaguroli, Jr. | B66C 9/14 | 212/331 |
| 2010/0059727 A1 * | 3/2010 | Suko | B66D 3/20 | 254/358 |
| 2011/0127477 A1 * | 6/2011 | Kokolis | B66C 13/16 | 254/285 |
| 2013/0001489 A1 * | 1/2013 | Ishikawa | B66D 3/16 | 254/342 |
| 2013/0112930 A1 * | 5/2013 | Davis | B66D 1/26 | 254/264 |
| 2015/0314998 A1 * | 11/2015 | Ishikawa | B66D 3/16 | 254/358 |
| 2016/0368737 A1 * | 12/2016 | Webster | B66B 7/066 | |
| 2017/0030813 A1 * | 2/2017 | Myers | G01L 5/047 | |

* cited by examiner

SAFETY ARRANGEMENT FOR A HOIST

CROSS REFERENCE TO RELATED PATENT APPLICATIONS

This application claims the benefit of U.S. provisional patent application No. 62/510,837 filed on May 25, 2017, and of U.S. provisional application Ser. No. 62/537,043 filed on Jul. 26, 2017, and of U.S. provisional application Ser. No. 62/556,692 filed on Sep. 11, 2017.

BACKGROUND OF THE INVENTION

This invention concerns powered hoists which are used for lifting loads by winding up a wrappable element such as chain or cable, with the load attached to a fitting at the lower end of the wrappable element. A chain is wrapped partially around a sprocket which is rotated to raise the load, and link chain is collected during a rising of the load chain by being directed into a receptable. A cable element can simply be wound up on a drum rotated to raise or lower the load. Such hoists are in widespread use, particularly in production in factories where hoists are in constant use, particularly the so called "air balancer" hoists are controlled and powered to neutralize the load and create the effect of weightlessness of the load in order to be easily maneuvered by production personnel.

Such extensive use of hoists may cause fatigue weakening of the chain or cable load carrying element, particularly if proper lubrication is not provided. The section of a chain which is repeatedly wrapped on the sprocket also wears due to the repeated wrapping and wrapping and may thereby weakened appreciably over time. Either factor may lead to sudden breakage of the chain if it is not replaced periodically before significant weakening occurs as a part of a careful maintenance regimen. Since such breakages could potentially allow a load to be dropped, damaging equipment and/or injuring personnel, it would be highly desirable to prevent a load from ever dropping in the event a load carrying element such as a chain (or cable) to the load suddenly breaks.

There has heretofore been a number of occurrences of such breakages, and in recognition of that fact, various measures have been devised in an attempt to protect against the possibility of damage or injuries when a chain or cable breaks.

In the context of a hoist used to lift a platform supported by two chains or cables each at a respective end of the platform, there has heretofore been proposed to provide each of the chains with a slack sensor determining when a slack develops in one of the chain or cable supports which occurs when the other of the support chains or cables breaks.

When this occurs, a brake is automatically applied to the unbroken cable on the other side to keep the platform from falling. Such an arrangement is described in U.S. Pat. No. 6,942,070.

Another hoist safety arrangement is available commercially which comprises a load arrester which has a separate cable or chain support connected to the load. The main cable/chain is connected to the upper side of the arrester and suspended from the hoist for up and down movement. This device senses when an excessive downward acceleration of the load occurs. The device then activates a brake to hold separate load arrester housing.

This approach is relatively complex and allows the load to drop for a significant distance before activation of the load arrester brake occurs. This allows significant momentum to build up which increases the forces necessary to be applied to stop the falling load, which increased force could possibly break the separate cable, and would at very least create a sharp jerking of the load.

It is an object of the present invention to provide a simple and reliable safety arrangement for a hoist which prevents a dangerous dropping of a load when a supporting chain or cable element breaks.

It is a further object to provide such security arrangement which quickly acts to hold a load suddenly released by a chain or cable breaking so as to not allow significant continued free fall motion of the released load to thereby minimize the momentum developed by the load in the event of a breakage of the main support chain or cable.

SUMMARY OF THE INVENTION

The above objects and other objects which will be appreciated by those skilled in the art, is accomplished by providing a redundant wrappable element such as a cable or chain in addition to a main load carrying element, both elements connected at a bottom end to the load, and both wound and unwound synchronously by a hoist drive mechanism to raise and lower the load. However, the redundant security support cable or chain is sufficiently longer than the shorter main chain or cable so as to be slack and not under tension when the load is raised or lowered by the main lift element cable or chain so as to not be subject to fatigue nor significant wear by its engagement with the sprocket or other drive member so as to be able to fully support the load after assuming the weight of the load if a main support cable or chain element breaks.

Since the redundant security support element is not normally loaded during hoist operation, significant wear of the redundant security support cable or chain will not occur, and thus the redundant chain or cable lift element will be fully capable of safely assuming the weight of the load in the event of a breakage of the main lift element.

The security lift element automatically assumes the full weight of load after dropping only a very short distance, i.e., a distance just sufficient to eliminate the slack to thereby stop the load from dropping any appreciable distance if the main lift element breaks.

Thus, the imposition of large momentum forces on the security lift element is avoided.

Thus, no complicated controls are required to bring about the weight of the load being assumed by the security lift element, and the transfer to the redundant lift element will occur almost instantly.

DETAILED DESCRIPTION

Figure 1:
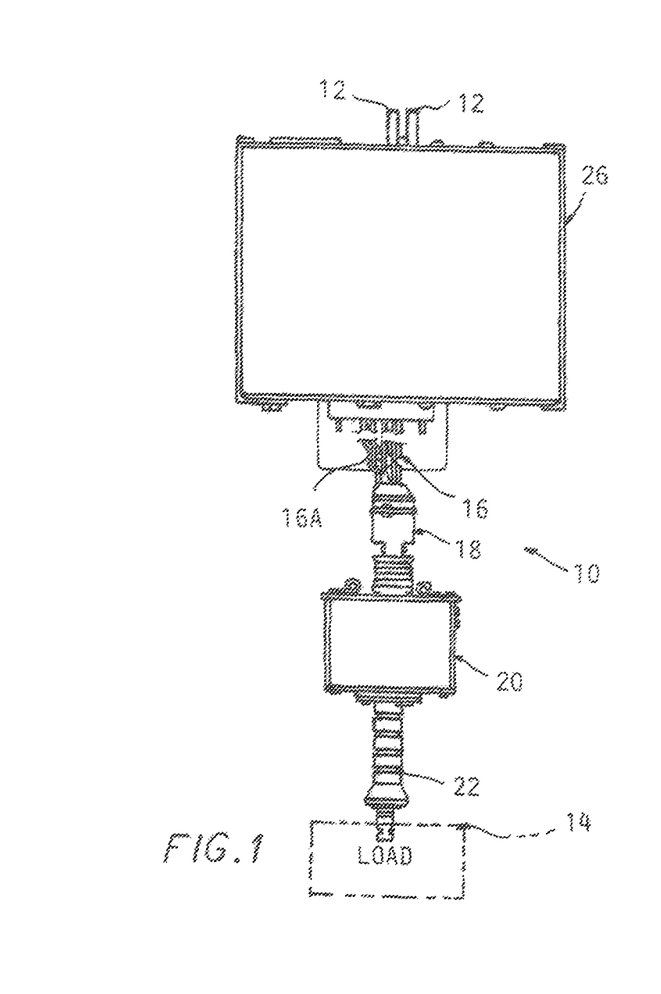
FIG. 1 is a side elevational view of a link chain balancer link chain hoist according to the invention with a load depicted in broken lines being held by the hoist.
Figure 2:
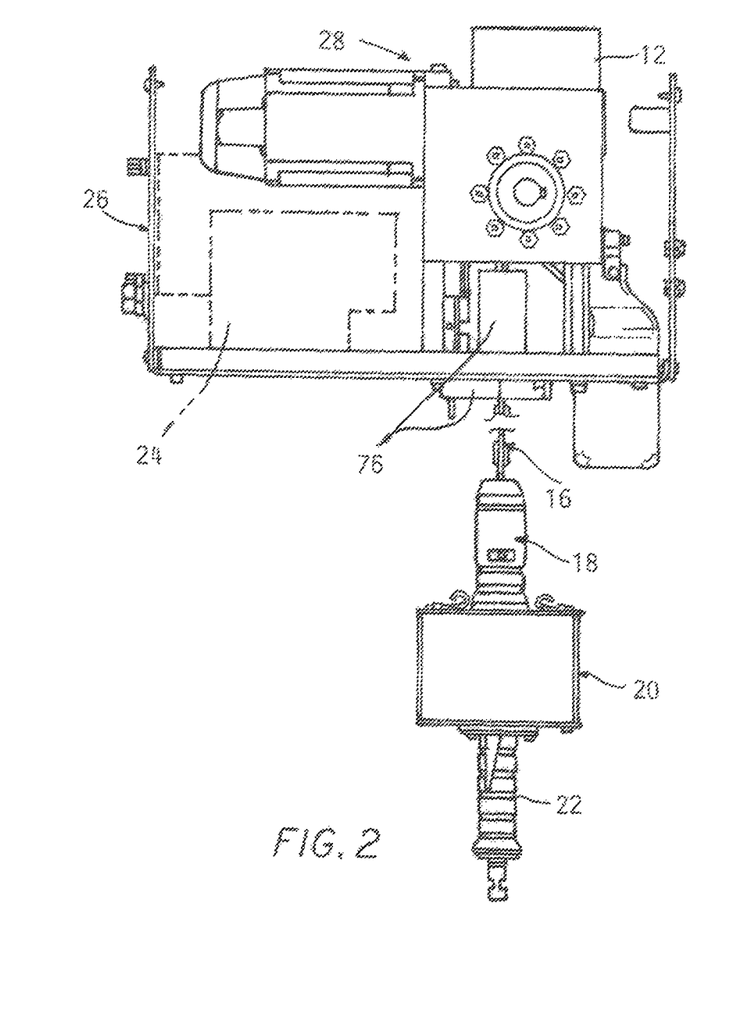
FIG. 2 is a side elevational view of the link chain balancing hoist shown in FIG. 1 rotated by ninety degrees and showing the interior of a housing to show drive components included in said hoist.

FIGS. 1 and 2 shows such a hoist 10 which is constructed according to the present invention typically adapted to be mounted to an over head structure (not shown) as by means of mounting plates 12A, 12B in a conventional fashion.

A load 14 is held by a wrappable lift element shown as a link main chain 16 extending up from a chain nest 18 to which the lower end is secured, as described in detail herein.

The chain nest 18 is in turn rotatably mounted to a load cell assembly 20 by an arrangement also as described in further detail below so as to allow relative rotation therebetween while maintaining a connection to a hand grip 22 extending down from the load cell assembly 20. The load 14 is thereby detachably secured to the main chain 16 to be raised and lowered.

The hoist 10 shown is of an air balancing type which allows a user to cause up and down movement of the load by manually exerting modest forces on the grip 22 in the well known manner, utilizing signals generated by the load cell assembly 20 and the action of a servo controller 24 located in a housing 26.

It should be understood that the present invention can be used with any type of hoist not only the balancer type shown.

The overhead supported housing 26 also contains a drive system 28 which is operated to raise and lower the main chain 16 and thereby also move the load 14 up or down.

Figure 3:
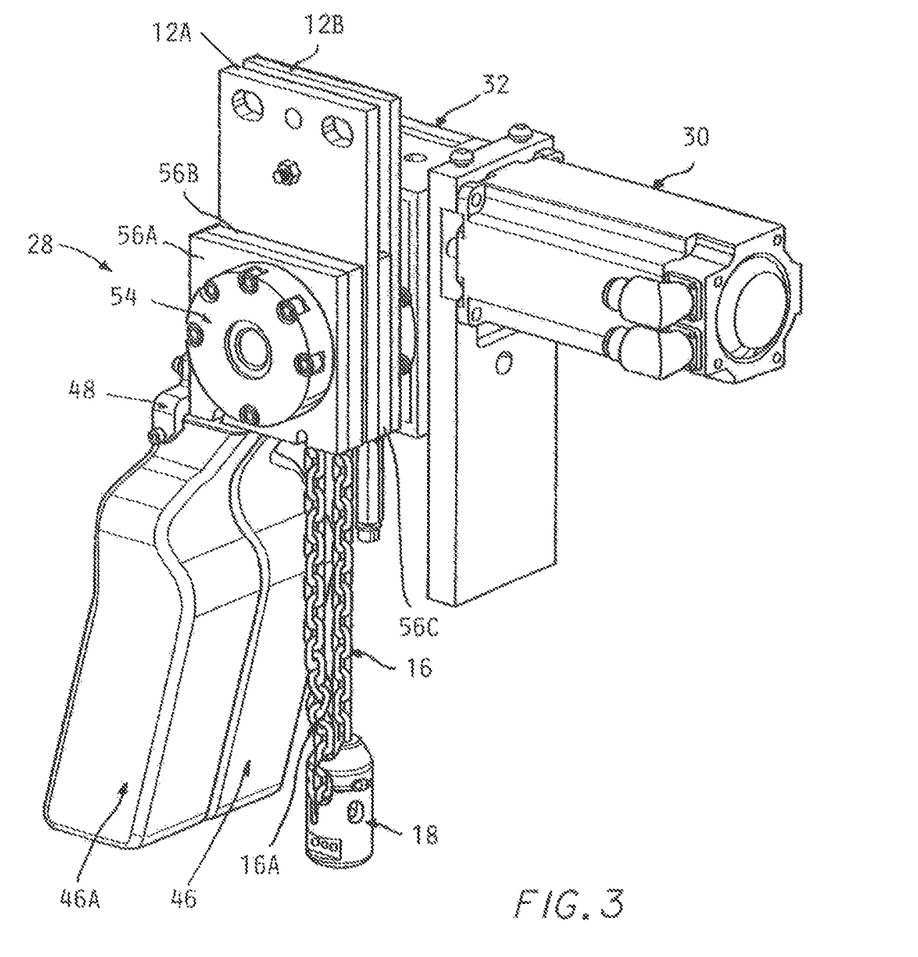
FIG. 3 is a perspective view of the drive system included in the hoist shown in FIGS. 1 and 2 equipped with two link chains.
Figures 5, 5A:
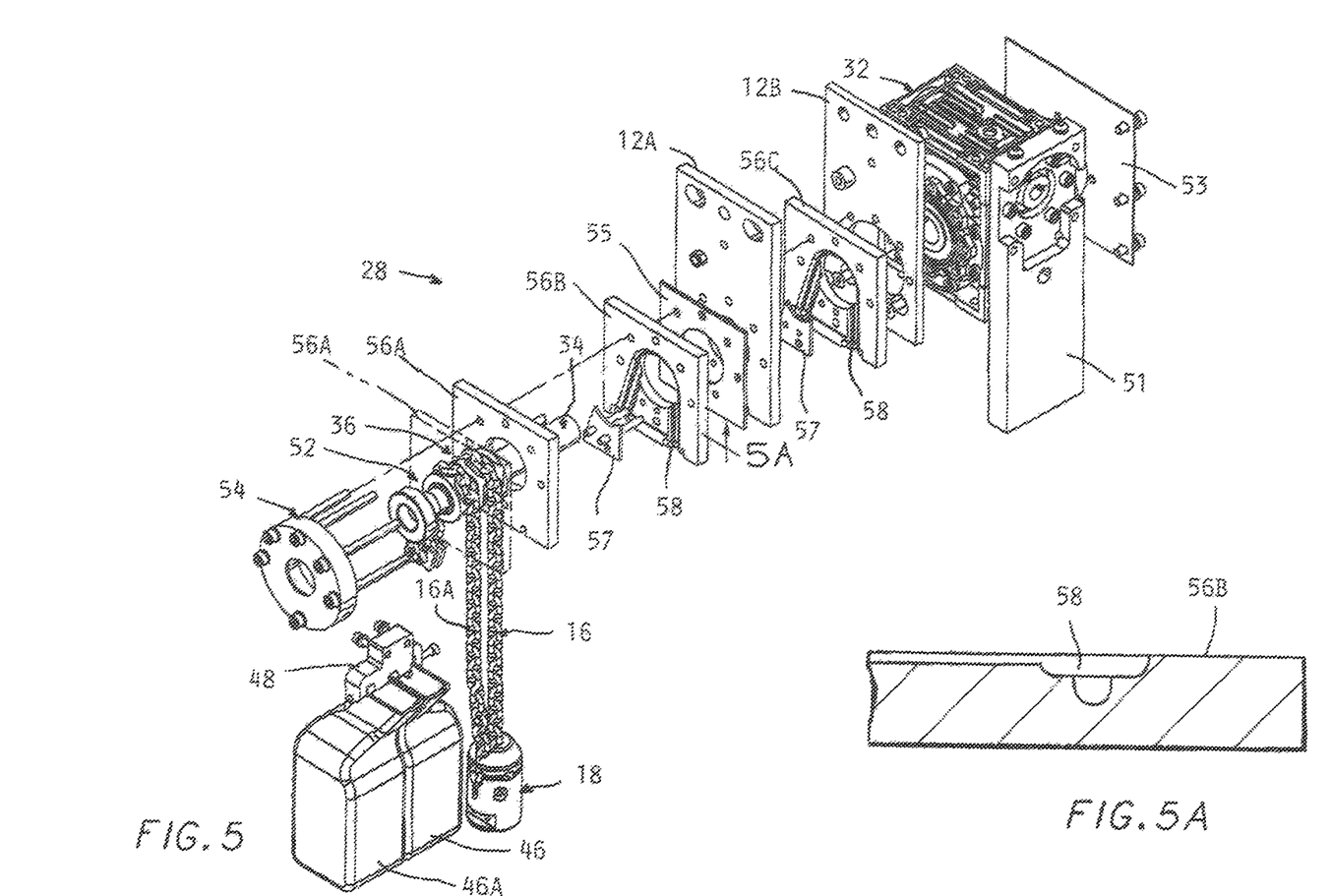
FIG. 5 is an exploded perspective view of the hoist drive components shown in FIG. 3.
FIG. 5A is a much enlarged sectional view of one of several guide plates in FIG. 5 showing the general shape of the chain guide surfaces.

FIGS. 3 and 5 show the main components of the drive system 28, which includes a drive motor 30 connected to a transmission 32.

Figures 4, 4A, 4B:
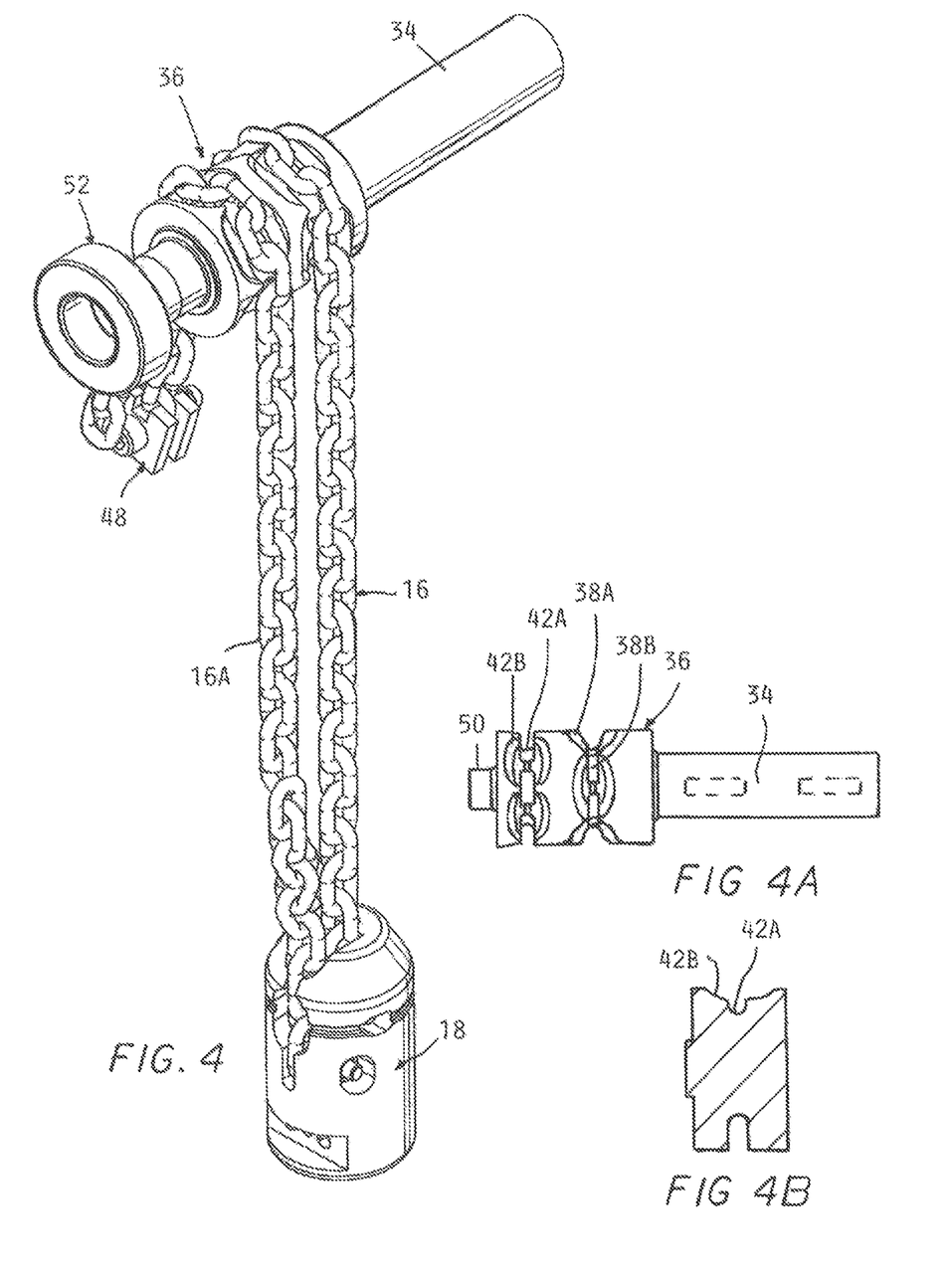
FIG. 4 is a perspective enlarged view certain drive components of the drive components shown in FIG. 3 with link chain guide plates removed to show a drive sprocket with link chains engaged therewith.
FIG. 4A is a side view of the sprocket shown in FIG. 4 with the link chains removed.
FIG. 4B is a section view taken through the sprocket shown in FIG. 4A.

The drive motor 30 which could be electrical, pneumatic or hydraulic is mounted to and drives right angle drive gearing transmission 32 to rotate a sprocket 28 (FIG. 2) by means of a shaft 34 connected to the output of the transmission 32 these has two sets of drive pockets 38A, 38B and 42A, 42B which extend around the perimeter of the sprocket 36. The features 38A, 38B, 42A, 42B are configured to engage alternating links 40A, 40B and 44B, 44A of the two chains 16, 16A disposed side by side. The two sets of drive pockets are preferably offset by one half link as seen in FIG. 4 to allow closer spacers 16, 16A closer together.

The output of the transmission 32 drives the sprocket shaft 34 of the sprocket 36. The sprocket 36 pockets 38A, 38B which receive successive links each in the two orientations of the chain links of the main chain 16 so as to create up or down movement of the main chain 16 upon rotation of the sprocket 36 in either direction. The sprockets 36 pockets 42A, 42B do the same with the links 44A, 44B so that the two chains 16, 16A are driven up and down synchronously with each other.

The above individual component features are well known in the context of a conventional single chain hoist and do not in themselves comprise the present invention.

Rather, the present invention comprises the provision of the longer second security chain 16A shown in the drawings extending alongside the main chain 16 and which is thereby connected to be synchronously raised and lowered by the rotation of the sprocket 36 in either direction by engagement of the successive links 44A, 44B with a second set of pockets 42A, 42B axially offset from the first set of pockets 38A, 38B.

The security chain 16A is of a slightly longer length than the main chain 16 extended from the chain nest 18 to which it is also affixed at one end to the sprocket 36.

This creates slack in the security chain 16A even with the load 14 being lifted as seen in FIGS. 1-3 and 4 so that the security chain 16A is not placed in tension by the weight of the load 14 and thus is not subject to fatigue or appreciable wear as would otherwise occur if placed in tension by the load 14.

The extent of slack should be of a degree so as to be such that as the main chain 16 wears and thus is caused to get longer over the service life of the main chain 16, the security chain 16A will always be longer than the main chain 16 so that the security chain does not become tensioned by its connection to the load over the service life of the main chain 16 as long as the main chain 16 remains intact.

To this end, this degree of slack could be on the order of one link for each four feet of travel of the chains 16, 16A, although this could vary depending on particular conditions, such as the rate of wear of the main chain 16, the length of the rated service life, etc.

Referring to FIG. 3, a chain receptacle 46, 46A is provided for each of the chains 16, 16A a bracket 48 used to mount the receptacles side to side in the housing 26. Again, this general arrangement has heretofore been used with a single chain hoist and is here doubled up to accommodate the redundant security chain 16A.

A stop 49 keeps the chains 16, 16A from moving off the sprocket 36 when the load 14 is fully lowered.

The sprocket 36 has its free end 50 rotatably supported in a bearing assembly 52 held by an end piece 54 bolted to a series of three stacked plates together 56A, 56B, 56C combined with the two tall plates 12A, 12B.

A first pair of plates 56A, 56B (FIG. 3) are sandwiched over the security chain 16A with guide surfaces 58 (not shown in plate 56A) engaging the chain links 44A, 44B to guide the same in movement around the sprocket 36 in the manner well known in the context of a single chain hoist described above.

A second pair of plates 12A and 56C have guide surfaces sandwiched over the main chain 16 in the same manner (plate 12A guide surfaces 58 not shown). These plates are not shown in their final assembled position as viewed in FIG. 5 for the sake of clarity.

Such pairs of guide plates with guide surfaces sandwiched over the links of a chain are well known with single chain hoists, with two sets provided in the present invention but incorporating the same arrangement here used for each chain in the double chain hoist.

A pair of pick plates 57 are provided to insure a smooth disengagement of each link from the pockets of the sprocket 36.

A housing end plate 53 and support member 51 attach the drive assembly to the housing 26. A spacer 55 is provided between the two pairs of guide plates.

It is important to keep two chains 16, 16A from being twisted together. Hence the chain nest 18 is rotatable on the load cell assembly 20 so that any rotation of the load 26 does not cause the chains 16, 16A to twist together. Such rotatable chain nest mounting has been provided heretofore but only in the context of a single chain hoist.

Figure 6:
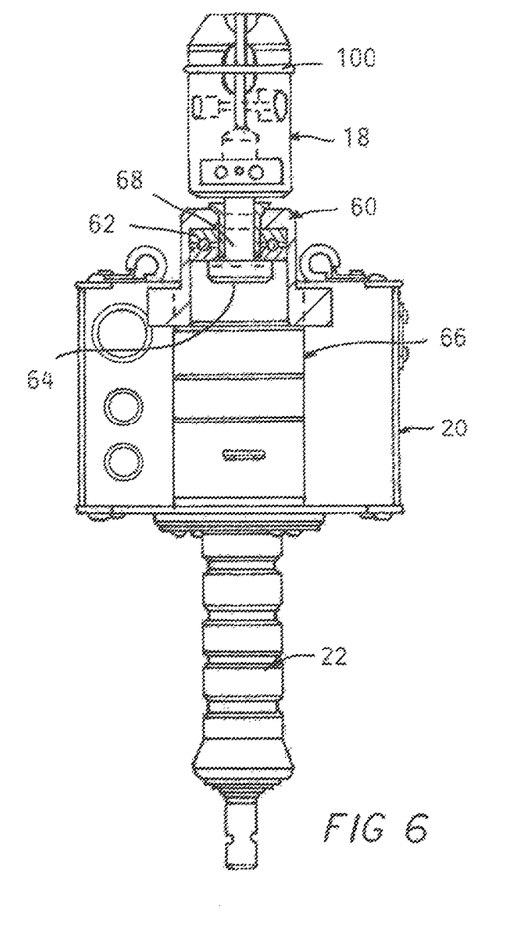
FIG. 6 is an enlarged side elevational view in partial section of the components mounted at the bottom of the link chains included in the hoist.
Figures 7, 7A:
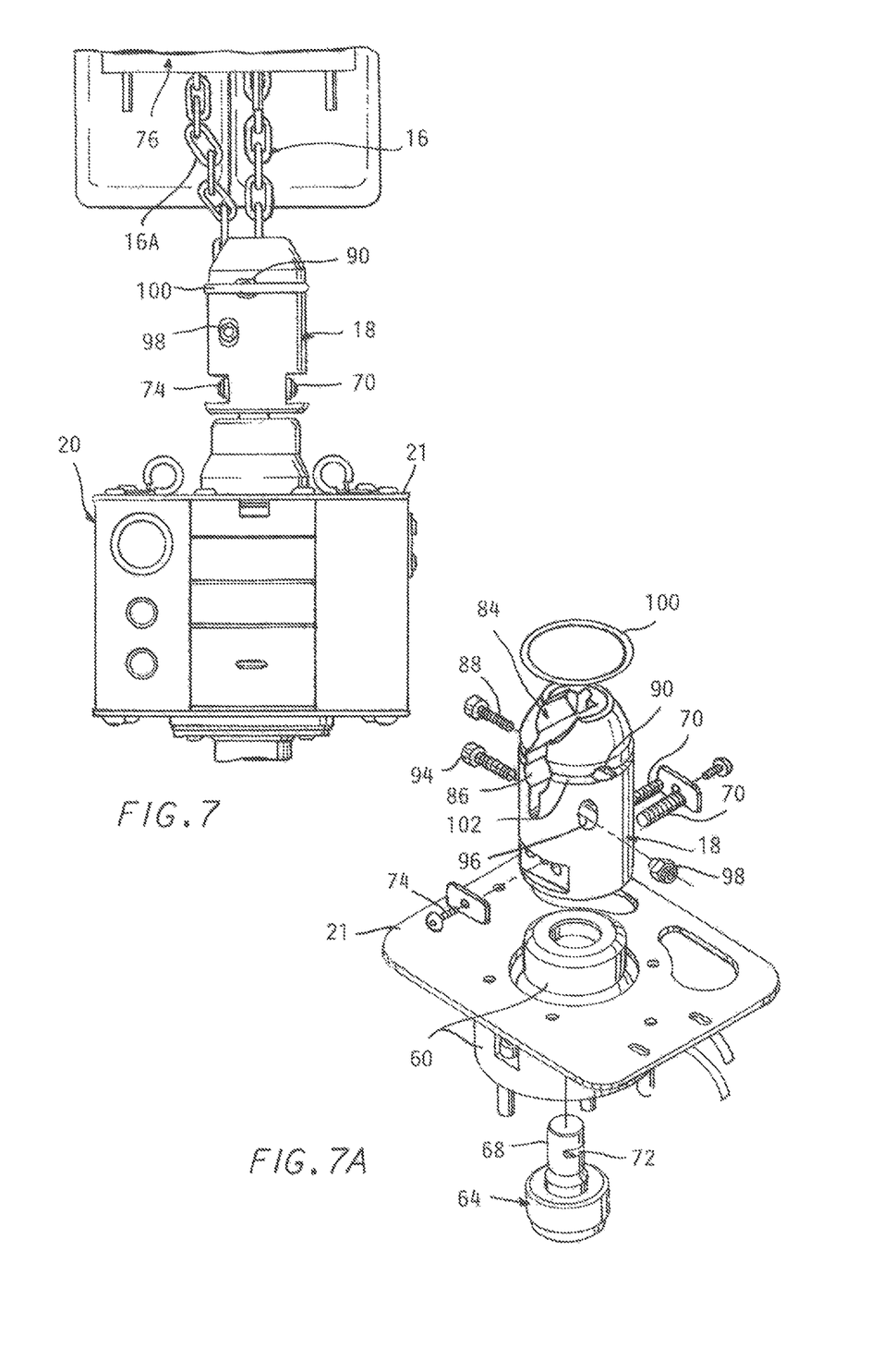
FIG. 7 is a further enlarged side elevational view of some of the components shown in FIG. 6.
FIG. 7A is an exploded perspective view of the components shown in FIG. 7.

Referring to FIGS. 6 and 7, the chain nest 18 is mounted to the load cell housing 20 by a bearing holder 60 bolted to the load cell assembly 20 receiving a ball bearing 62 in an inside bore.

A chain hanger adapter pin 64 has a stem 68 is received in a bore in the chain nest 18, with cross pins 70 (FIG. 7A) extending through slots 72 to capture the adapter pin 64. A screw 74 can further secure the adapter pin 64.

Figure 9:
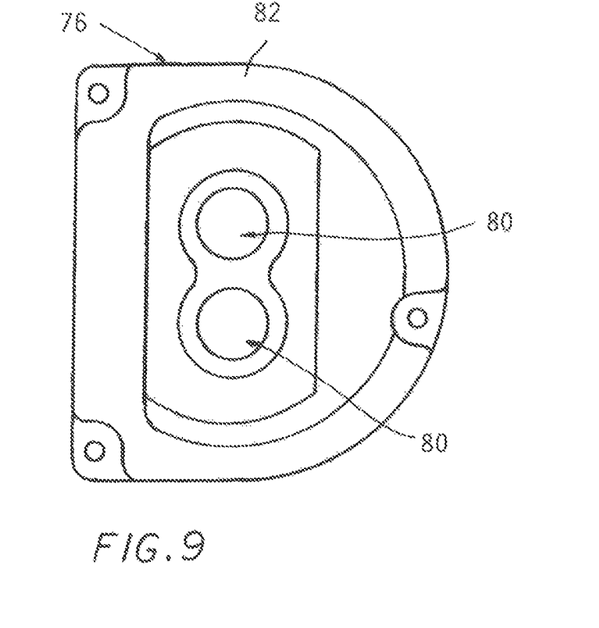
FIG. 9 is a top view of the chain guide piece shown in FIG. 8.

This allows relative rotation of chain nest 18 relative the housing 20, handle 32 and load 14 to retard any tendency for twisting together of the chains 16, 16A which could potentially interfere with engagement with the sprocket 36 (FIG. 9).

Figure 8:
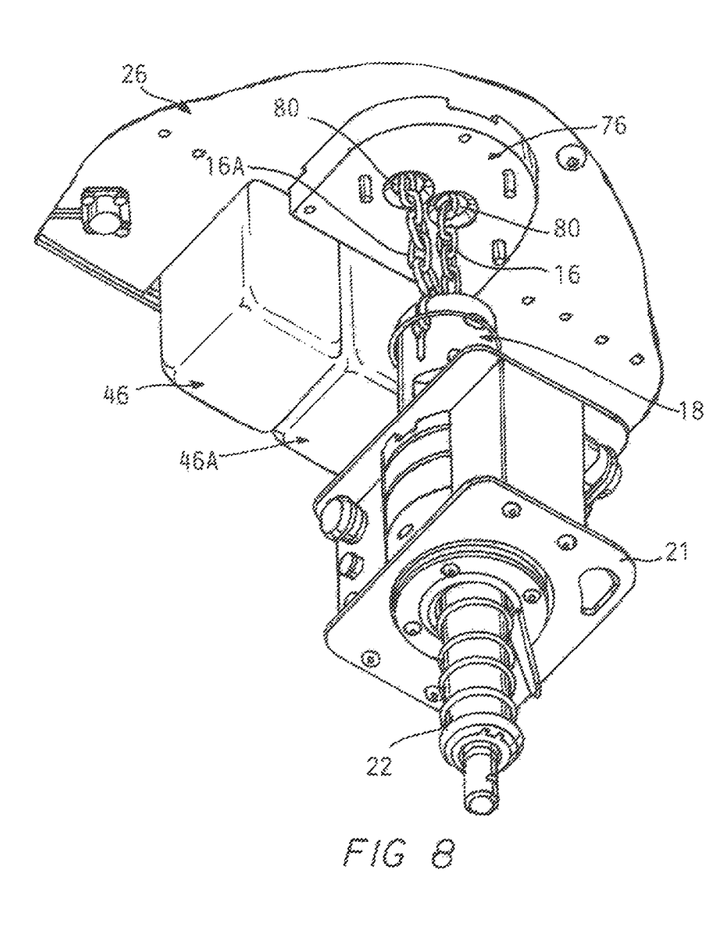
FIG. 8 is a perspective view looking up from beneath the hoist housing shown in FIG. 2 showing the link chains passing into a guide piece attached to the housing.

An upper guide 76 attached to the housing 26 by a flange 82 has holes 80 receiving a respective chain 16, 16A (FIG. 8) prior to passing onto the sprocket 36, which inhibits any tendency of the chains 16, 16A to twist together.

Figure 10:
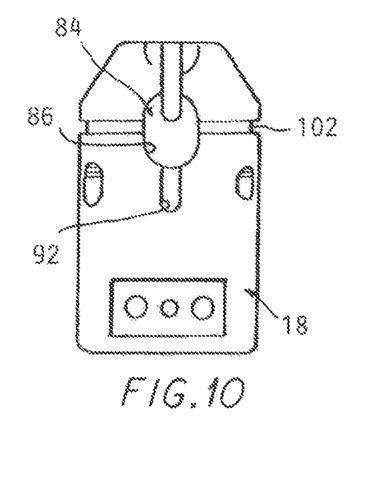
FIG. 10 is an enlarged side view of a chain nest included in the components shown in FIG. 7A.
Figure 11:
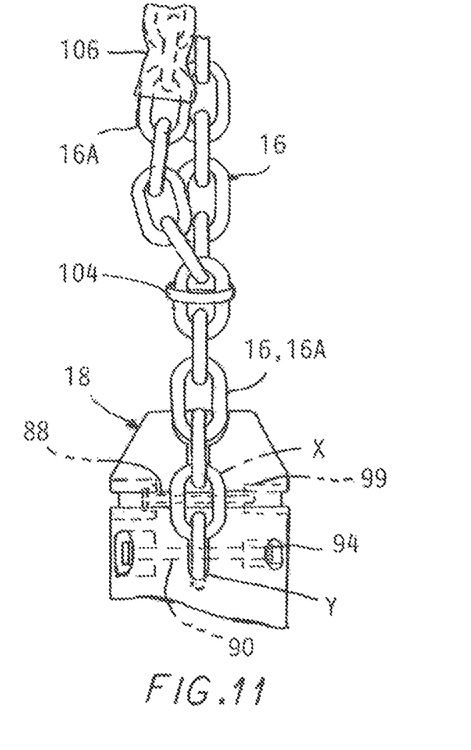
FIG. 11 is a fragmentary front view of the chain nest shown in FIG. 10 with two lengths of a main lift chain and three links of a redundant lift chain installed therein.

The chains 16, 16A are both received in the chain nest 18 and held therein, both passing into a cavity 84 (FIG. 10) machined into one side thereof and configured to receive chain links in either of the two orientations of the chain links 16, 16A.

The main chain 16 has its two bottom links against the rear wall of cavity 84, with bottommost link X flat to the viewer in cavity section 86. An upper cross screw 88 extends through a hole to lie across the outer side of the link X with a nut 89 to hold the same in that position.

A bottommost link Y of security chain 16A is oriented sideways and fit in slot cavity section 90 (FIG. 10) accommodating that shape. A lower screw 90 extends crossways through a hole to be located to hold the link Y in position in cavity section 92 (FIG. 10), secured with a nut 94 inserted in a cross hole 96 and into nut 98 at a point where the screw 96 passes through the on edge link of chain 16A to hold the same to the chain nest 18.

A small O-ring 102 keeps the slack of chain 16A away from the chain next 18.

A colored cover 104 can be used to easily tell the chains 16, 16A apart.

The invention claimed is:

1. A hoist security arrangement for a hoist having an elongated wrappable main lift element raised or lowered by rotation of a drive member around which said main lift element is at least partially wrapped to lift a load attached to said main lift element so as to be fully supported solely by said main lift element, said security arrangement including an elongated wrappable security lift element also at least partially wrapped around said drive member and extending alongside said main lift element and raised or lowered therewith, said security lift element also attached to said load but of a sufficiently longer length than said main lift element extending between said drive member and said load so as to just remain slack and not be tensioned by any portion of the weight of said load as long as said main lift element remains intact, but if said main lift element breaks said security lift element thereafter assumes all of the weight of said load.

2. The hoist security arrangement according to claim 1 wherein said main and security lift elements are comprised of a main link chain, and a separate security link chain, and wherein both of said link chains are engaged by a respective one of an aligned circumferentially extending series of pockets on a sprocket drive member, said sprocket drive member being rotatable in either direction by a motor to cause both of said link chains to be simultaneously raised or lowered by rotation of said sprocket drive member but said load raised or lowered solely by movement of said main link chain as long as said main link chain is intact but upon breakage of said main link chain said security link chain thereafter solely supports said load.

3. The hoist security arrangement according to claim 1 wherein said security lift element is sufficiently longer than said main lift element so as to remain longer than said main lift element even after said main lift element lengthens over a service life of said main lift element due to wear caused by repeated windings of said main lift element on said drive member over said service lift of said main lift element.

4. The hoist security arrangement according to claim 2 wherein respective pairs of guide plates are fixedly mounted to a housing so as to sandwich lengths of said main link chain and said security link chain, said pairs of guide plates each having guide surfaces engaging each respective link chain as said chains are drawn onto said sprocket drive member.

5. The hoist security arrangement according to claim 2 wherein a lower end of said main and security link chains are both attached to a load through a chain nest and said chain nest is mounted to be rotatable relative said load if said load is rotated by a user whereby any tendency for twisting together of said link chains caused by rotation of said load is minimized.

6. A security arrangement for a hoist having a main chain able to be raised by a hoist drive to lift a load attached to said main chain solely by said main chain, said security arrangement including a security chain extending along side of said main chain and also moved synchronously by said hoist drive and also attached to said load but of a longer length between said load and said hoist drive than said shorter main chain to create sufficient slack in said security chain so as to not support said load so long as said main chain remains intact but supporting the entire weight of said load upon breakage of said main chain; wherein the main chain and the security chain are at least partially wrapped around the hoist drive.

7. The security arrangement according to claim 6 wherein an upper part of both chains are engaged by a respective one of an aligned set of pockets on a rotary sprocket, said sprocket included in said hoist drive to cause both chains to be wound and unwound simultaneously but to raise or lower a load solely by said movement of said main chain which is the only chain supporting said load as long as said main chain remains intact, said security chain only being tensioned by the entire weight of said load upon breakage of said main chain whereupon the entire weight of said load is assumed by said security chain.

8. The security arrangement according to claim 7 wherein a separate collection receptacle is provided for collecting and dispensing each chain.

9. A method of preventing dropping of a load connected to a load supporting wrappable main lift element included in a hoist upon breakage of said main lift element, said main lift element having a lower end connected to said load so as to be the sole support of said load, said method comprising installing a wrappable security lift element extending alongside said main lift element and having a lower end right next to said lower end of said main lift element, said security lift element of a sufficiently longer length than said main lift element so as to not be tensioned by any portion of the weight of said load despite said security lift element, also being connected to said load but without supporting any portion of the weight of said load due to slack created by longer length thereof as long as said main lift element is intact, said main lift element being shorter than said security lift element so as to support the entire weight of said load such that said slack is created in said security lift element which slack exists as long as said main lift element is intact, but if said main lift element breaks, said security lift element thereafter is substantially immediately brought into tension by assuming the entire weight of said load and thereafter continues to support the full weight of said load; wherein the main lift element and the security lift element are at least partially wrapped around a drive member.

\* \* \* \* \*